United States Patent [19]

Asgeirsson

[11] 3,714,041

[45] Jan. 30, 1973

[54] THICKENED ORGANIC LIQUIDS

[75] Inventor: Asgeir Asgeirsson, Newtonville, Mass.

[73] Assignee: Cabot Corporation, Boston, Mass.

[22] Filed: Jan. 17, 1967

[21] Appl. No.: 609,759

[52] U.S. Cl. .......................252/13, 252/28, 252/317
[51] Int. Cl. ..........................C10m 5/04, C10m 7/08
[58] Field of Search...................252/317, 316, 28, 13

[56] References Cited

UNITED STATES PATENTS

| | | | |
|---|---|---|---|
| 2,593,125 | 4/1952 | Eaton et al. | 252/317 |
| 2,902,351 | 9/1959 | Stokes | 252/28 X |
| 2,980,612 | 4/1961 | Potter | 252/28 |
| 3,131,148 | 4/1964 | Taulli | 252/28 |

*Primary Examiner*—Daniel E. Wyman
*Assistant Examiner*—I. Vaughn
*Attorney*—Kenneth W. Brown

[57] ABSTRACT

Organic liquids thickened with small amounts of:
  A. colloidal silica selected from the group consisting of pyrogenic silicas, silica aerogels, and mixtures thereof, and
  B. fibrous asbestos.

16 Claims, No Drawings

THICKENED ORGANIC LIQUIDS

It is well known that liquids such as polyester, alkyd or epoxy resins, paraffin oils, and the like, can be thickened by incorporation therein of various colloidal silicas having an average particle diameter of less than about 100 millimicrons and preferably less than about 50 millimicrons. Thus, the use of such silicas in various thickening applications such as in the production of greases from oils or the production of thixotropic paints, resinous gel coats and the like has enjoyed considerable commercial success.

Usually in the art of thickening liquids, it is desirable to utilize as little of a thickening agent as possible to gain the desired thickening effect. In accordance with the present invention substantial increases in the thickening efficiency of certain finely-divided silicas are effected.

It is a principal object of the present invention to provide an improved process for thickening liquids.

It is another object of the present invention to provide novel thickening compositions.

Other objects of the present invention will in part be obvious and will in part appear hereinafter.

In accordance with the present invention it has been discovered that synergistic thickening effects in liquid systems are achieved when there are utilized multicomponent thickening compositions comprising certain colloidal silicas as the primary component and certain particulate inorganic solids as the secondary component.

Generally speaking, colloidal silicas suitable for use as the primary component in the liquid thickening compositions of the present invention are distinguished by a BET-$N_2$ surface area of greater than about 50 $M^2$/gram and preferably above about 150 $M^2$/gram. In addition to the above minimum surface area requirement, it is important that the colloidal silica be produced by a pyrogenic or aerogel process.

Pyrogenic silicas, which are the much preferred silicas for use in the compositions of the present invention, are produced by the high temperature (i.e. above about 800°C) oxidation or hydrolysis of a silicon compound. At present, commercial production of pyrogenic colloidal silicas is usually accomplished by charging vapors of a silicon compound, such as silicon tetrachloride, silicon tetrafluoride, or silicon sulfide, into a high temperature oxidizing and/or hydrolyzing flame. Other methods for producing pyrogenic silicas are known, however, and are intended to be included within the scope of the invention. For instance, it has been demonstrated that suitable silicas can also be produced by heating silicon compounds in an electric arc and thereafter converting the resultant siliceous vapors to silica.

Silica aerogels are, broadly speaking, the product of a liquid phase precipitation process and are distinguished from ordinary liquid phase process silicas by the unique method utilized in drying of the silica product. Generally, in producing ordinary precipitated silicas, a solution of alkali metal silicate is acidified, thereby precipitating silica from the solution to form a gel or sol. Said gel or sol is washed to remove undesired salts and is then dried to recover the silica product.

In the silica aerogel process, the drying step is carried out by heating the washed sol or gel to at least the critical temperature of the solvent and only thereafter is said solvent "bled off" from the system. The resulting silica aerogel product is normally very much less dense and more fluffy, and retains much of its original "spongelike" structure in comparison to ordinary precipitated silicas. Further details relating to the aerogel process can be had by reference to U.S. Pat. Nos. 2,093,454, 2,285,449 and 2,993,005.

Particulate inorganic solids useful as the second component in the thickening compositions of the present invention generally belong to that class of minerals known generically as asbestos.

For the purposes of the present invention the general term "asbestos" refers to any fibrous mineral silicate such as the amphibole class of which crocidolite, anthophyllite, amosite, actinolite and tremolite are members and the serpentine class of which crysotile is an important and preferred member. It should be noted that asbestos is often treated in order to impart thereto certain desirable properties such as improved color, purity, etc. For instance, an asbestos can be treated by an acid-digestion process in order to remove impurities or by a high temperature treatment in order to modify the fibrous structure thereof. Asbestos treated by any of such processes is also specifically included within the scope of the present invention. Primary asbestos fibers generally average between about 0.01 and about .5 microns in diameter. Preferred asbestos for use in the present invention generally has an average primary fiber diameter of less than about 1 micron.

It is obviously important in choosing any of the components forming part of the thickening compositions of the present invention for use in a particular liquid that said components should be substantially chemically inert with respect to said liquid.

The relative amount of each of the components forming the thickening compositions of the present invention is subject to considerable variation. Generally speaking, said compositions should comprise at least about 20 wt. percent of the primary silica component. Preferably, however, the compositions will normally comprise between about 50 and about 95 wt. percent of the silica component.

The manner in which the aforedescribed components are combined to form the thickening compositions of the present invention is generally not critical. Normally, simple dry mixing methods known to the art, such as tumble mixing of the primary silica component with the secondary asbestos component are entirely sufficient. It is also generally suitable to mix the components in situ, i.e. in the liquid desired to be thickened. It will be apparent that this latter method of blending can be accomplished when the thickening composition components are dispersed separately or together into the liquid matrix. Additionally, when said components are dispersed separately, the order of addition thereof into the liquid is normally not critical.

Dispersion methods useful for the incorporation of particulate solid thickening compositions in liquids are generally well known and understood. Depending somewhat on the particular thickening composition/liquid combination to be formulated, relatively passive dispersion by "low shear" mixing methods such as hand stirring are often satisfactory. However, it is often advantageous to disperse the composition by means which impart substantial quantities of shear work to the system, such as roll mills, high speed blenders, ultrasonic mixers, and the like. Further, the liquids to be treated can generally be heated in order to render greater facility to the incorporation of the thickening compositions thereinto.

The amount of the thickening composition utilized in the liquid to be treated can vary greatly depending on such parameters as: the particular thickening composition utilized, the particular liquid to be treated, the extent of thickening desired, the degree of dispersion of the composition, the presence of additives, curing agents, etc. With respect to the term "additives" mentioned hereinbefore, it should be borne in mind that many substances such as cationic, anionic and nonionic surfactants and certain polar liquids are known to the art which can vastly affect the thickening efficiency of silicas in liquids. Such substances are normally utilized in relatively minor amounts, i.e. less than about equal to the weight of the total thickening composition and usually less than about 50 percent by weight of the thickening composition. In any case, bearing the above considerations in mind, it will generally be found that the amount of thickening composition utilized can vary from about 0.25 percent to about 50 percent by weight of the liquid to be thickened.

For the purposes of the present specification and claims, the term "liquid" refers to those substances which, under the aforementioned dispersion conditions and prior to the addition thereinto of the thickening composition (1) flow continuously in response to shear stresses applied thereto, (2) do not recover substantially when said shear stresses are removed, and (3) maintain substantially constant volumes at constant temperatures.

A better understanding of the present invention and the beneficial effects accruing from the practice thereof can be had by reference to the following non-limiting examples:

EXAMPLE 1

There is charged into each of five 500 milliliter jars 300 grams of ethylene glycol having a viscosity at a temperature of 70°F of about 15 centipoises as determined by Brookfield viscometric analysis at a spindle speed of 6 r.p.m. The contents of the jars are maintained at about 70°F and there additionally is charged into each about 9 grams of various thickening compositions comprising a pyrogenic silica having an average particle diameter of about 15 millimicrons and a BET-$N_2$ surface area of about 200 $M^2$/gram and/or a serpentine asbestos chrysotile, having an average primary fiber diameter of about 18 millimicrons. Each of said compositions was prepared by mixing the components in a 2000 c.c. capacity laboratory twin cone mixer for about 30 minutes. The thusly prepared thickening compositions were then stirred into the ethylene glycol samples by means of a high-speed blender operated at about 10,000 r.p.m. for about 5 minutes. Following the stirring step, the contents of the jars were allowed to stand in a quiescent state for about 12 hours. Next, each of the resulting thickened liquid samples was tested viscometrically as previously described. The particular thickening compositions utilized and the viscometric effects resulting from use thereof in the ethylene glycol are tabulated in Table I below. (Samples A–E).

TABLE I

| Sample | Wt. Percent Ratio Silica/Asbestos | Brookfield Viscosity (Centipoises 6 R.P.M.) |
|---|---|---|
| Ethylene Glycol | None | 15 |
| A | 100/0 | 25 |
| B | 0/100 | 2,540 |
| C | 25/75 | 17,900 |
| D | 50/50 | 12,200 |
| E | 75/25 | 2,960 |

EXAMPLE 2

The procedure described in Example 1 was repeated with the exception that in the present example the liquid thickened was paraffin oil USP having a Brookfield viscosity of about 150 centipoises at 70°F. Further, there was utilized as the thickening agent in the present Example a mixture comprising as the primary component a silica aerogel having an average primary particle diameter of about 10 millimicrons and a BET-$N_2$ surface area of about 400 $M^2$/gram and as the secondary component chrysotile having an average primary fiber diameter of about 25 millimicrons. About 3 grams of the thickening agent was utilized in each 300 gram sample of the paraffin oil. The viscometric analyses of the resulting thickened liquid systems are shown below in Table II. (Samples K–O)

TABLE II

| Sample | Wt. Percent Ratio Silica/Asbestos | Brookfield Viscosity (Centipoises 6 R.P.M. |
|---|---|---|
| paraffin Oil USP | None | 150 |
| K | 100/0 | 2700 |
| L | 0/100 | 2100 |
| M | 25/75 | 5740 |
| N | 50/50 | 8120 |
| O | 75/25 | 6740 |

EXAMPLE 3

The procedure of Example 1 was repeated with the exception that instead of ethylene glycol there was utilized a liquid polyester resin having a viscosity of about 395 centipoises at 70°F. The asbestos used was chrysotile of the same type as that utilized in Example 1. The viscosities resulting from the use of the various thickening compositions thus produced and which varied only in the proportion of the primary silica component to the secondary asbestos component are shown in Table III below (Samples P–T). The total concentration of the thickening agent used in each sample represented about 3 percent by weight of the liquid thickened.

TABLE III

| Sample | Wt. Percent Ratio Silica/Asbestos | Brookfield Viscosity (Centipoises 6 R.P.M. |
|---|---|---|
| Polyester resin | None | 395 |
| P | 100/0 | 12,500 |
| Q | 0/100 | 11,800 |
| R | 25/75 | 15,500 |

| | | |
|---|---|---|
| S | 50/50 | 19,000 |
| T | 75/25 | 16,000 |

When the above procedure is repeated with the exception that the thickening agents are incorporated into the polyester resin by hand stirring instead of by use of a high-speed blender, the relative results are substantially the same although of a lower order of attained viscosities than shown in Table III.

Obviously, many changes can be made in the above Examples and discussion without departing from the scope of the invention.

For instance, although only polyester resins, ethylene glycol and paraffin oil were specifically mentioned in the above Examples it is obvious that the beneficial effects provided by the thickening compositions of the present invention can also be effected in other liquids such as alcohols, epoxy resins, vegetable and mineral oils, and the like.

What is claimed is:

1. An improved thickening composition for organic liquids which comprises:
   a. between about 25 and about 95 wt. percent of a colloidal silica having a BET-$N_2$ surface area of at least about 50 $M^2$/gram chosen from the group consisting of pyrogenic silicas, silica aerogels, and mixtures thereof, and
   b. between about 75 and about 5 wt. percent of fibrous asbestos having an average primary fiber diameter of less than about 5 microns.

2. The composition of claim 1 wherein said colloidal silica comprises between about 50 and about 95 weight percent of the total composition.

3. The composition of claim 1 wherein said colloidal silica has a BET-$N_2$ surface area of greater than about 150 $M^2$/gram.

4. The composition of claim 1 wherein said colloidal silica is a pyrogenics silica.

5. The composition of claim 1 wherein said asbestos has an average primary fiber diameter of less than about 1 micron.

6. The composition of claim 5 wherein said asbestos is chrysotile.

7. A process for thickening organic liquids selected from the group consisting of hydrocarbon oil and ethylene glycol which comprises dispersing into said organic liquid between about .25 and about 50 percent by weight of said liquid of a composition comprising
   a. between about 25 and about 95 weight percent of a colloidal silica having a BET-$N_2$ surface area of at least about 50 $M^2$/gram and chosen from the group consisting of pyrogenic silicas, silica aerogels and mixtures thereof, and
   b. between about 5 and about 75 wt. percent of fibrous asbestos having an average primary fiber diameter of less than about 5 microns.

8. The process of claim 7 wherein said colloidal silica has a BET-$N_2$ surface area of at least about 150 $M^2$/gram.

9. The process of claim 7 wherein said colloidal silica is a pyrogenic silica.

10. The process of claim 7 wherein the amount of said colloidal silica utilized comprises between about 50 and about 95 weight percent of said composition.

11. The process of claim 7 wherein said asbestos has an average primary fiber diameter of less than about 1 micron.

12. The process of claim 11 wherein said asbestos is chrysotile.

13. The process of claim 7 wherein said liquid is ethylene glycol.

14. The process of claim 7 wherein said liquid is a hydrocarbon oil.

15. A thickening agent comprising synergistic proportions of an admixture of (a) a silica material selected from the group consisting of silica aerogel, pyrogenic silica and mixtures thereof, and (b) chrysotile asbestos.

16. A composition of matter comprising a mixture of (1) an organic liquid selected from the group consisting of hydrocarbon oil and ethylene glycol; and (2) a thickening agent comprising synergistic proportions of (a) a silica material selected from the group consisting of silica aerogel, pyrogenic silica and mixtures thereof; and (b) chrysotile asbestos; the amount of said thickening agent being sufficient to increase the viscosity of said organic liquid.

* * * * *